(12) United States Patent
Miyahara

(10) Patent No.: US 10,623,643 B2
(45) Date of Patent: Apr. 14, 2020

(54) IMAGE PROCESSING APPARATUS CAPABLE OF PERFORMING IMAGE STABILIZATION BASED ON COMMUNICATION RESULT, AND METHOD, IMAGE CAPTURING APPARATUS, AND IMAGE CAPTURING SYSTEM

(71) Applicant: CANON KABUSHIKI KAISHA, Tokyo (JP)

(72) Inventor: Shimpei Miyahara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/612,509

(22) Filed: Jun. 2, 2017

(65) Prior Publication Data
US 2017/0353667 A1    Dec. 7, 2017

(30) Foreign Application Priority Data
Jun. 6, 2016 (JP) .................. 2016-112955

(51) Int. Cl.
*H04N 5/232* (2006.01)

(52) U.S. Cl.
CPC ..... *H04N 5/23287* (2013.01); *H04N 5/23209* (2013.01); *H04N 5/23258* (2013.01); *H04N 5/23267* (2013.01)

(58) Field of Classification Search
CPC ........... H04N 5/23287; H04N 5/23258; H04N 5/23248; H04N 5/23251; H04N 5/23254; H04N 5/23264; H04N 5/23267; H04N 5/23274; H04N 5/2328; H04N 5/23209

USPC ........ 348/208.1, 208.2, 208.4, 208.5, 208.6, 348/208.7, 208.11
See application file for complete search history.

(56) References Cited

U.S. PATENT DOCUMENTS

| | | | | |
|---|---|---|---|---|
| 2005/0104971 A1* | 5/2005 | Pilu | ........................ | H04N 5/145 348/208.99 |
| 2006/0171707 A1* | 8/2006 | Higuma | .................. | G03B 7/20 396/529 |

(Continued)

FOREIGN PATENT DOCUMENTS

JP    2003-186074 A    7/2003

*Primary Examiner* — Albert H Cutler
(74) *Attorney, Agent, or Firm* — Cowan, Liebowitz & Latman, P.C.

(57) ABSTRACT

An image processing apparatus comprising: an acquisition unit that acquires an image stabilization correction amount based on image stabilization information acquired from an external device via a communication unit; a prediction unit that predicts an image stabilization correction amount based on an image stabilization correction amount used in the past; a selector that selects one of the image stabilization correction amount acquired by the acquisition unit and the image stabilization correction amount predicted by the prediction unit; and an image stabilization unit that performs image stabilization based on the image stabilization correction amount selected by the selector. If the image stabilization information is successfully acquired, the selector selects the image stabilization correction amount acquired by the acquisition unit, and if the image stabilization information is not successfully acquired, the selector selects the predicted image stabilization correction amount.

18 Claims, 4 Drawing Sheets

(56) References Cited

U.S. PATENT DOCUMENTS

| | | | | |
|---|---|---|---|---|
| 2009/0027544 A1* | 1/2009 | Grewal | .............. | H04N 5/23248 348/352 |
| 2014/0204228 A1* | 7/2014 | Yokokawa | ......... | H04N 5/23267 348/208.6 |
| 2017/0078575 A1* | 3/2017 | Ryu | ........................ | G06T 7/277 |

* cited by examiner

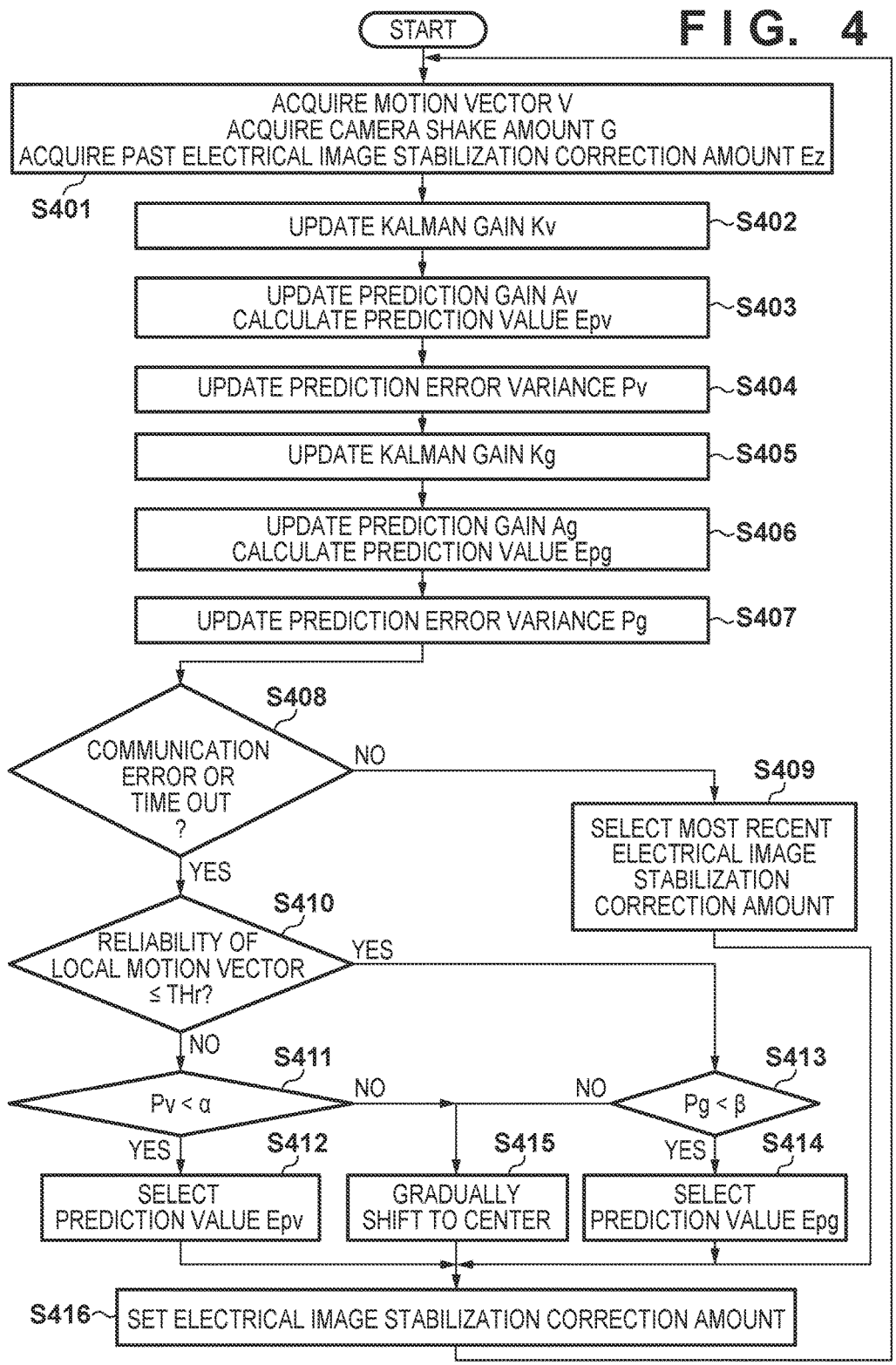

IMAGE PROCESSING APPARATUS CAPABLE OF PERFORMING IMAGE STABILIZATION BASED ON COMMUNICATION RESULT, AND METHOD, IMAGE CAPTURING APPARATUS, AND IMAGE CAPTURING SYSTEM

BACKGROUND OF THE INVENTION

Field of the Invention

The present invention relates to an image processing apparatus and method, an image capturing apparatus and an image capturing system in which an image processing apparatus is mounted.

Description of the Related Art

An image capturing apparatus and an interchangeable lens are known which include image stabilization devices that drive a moveable lens or an image sensor so as to correct image blurring caused by detected camera shake. This type of image stabilization function is referred to as optical image stabilization. Also, in recent years, there has been an image stabilization function that cuts out and outputs a frame image in the direction of canceling out camera shake in a video, and this has been used in image capturing apparatuses that are small and lightweight, mobile telephones with image capturing apparatuses, and the like. This type of image stabilization function is referred to as electrical image stabilization.

An angular velocity sensor (gyrosensor) is commonly used as a method for detecting camera shake, and a lens or an image sensor is driven in the direction of canceling out blurring based on the detected angular velocity. Also, in recent years, due to an increase in the frame rates of image capturing apparatuses and improvements in image processing, there has been known to be a technique of detecting blurring by analyzing blurring in images between frames and obtaining motion vectors.

With camera shake detection using motion vectors, there are techniques in which elements other than camera shake, which are caused by miscalculation of motion vectors due to image noise and object blurring, are removed as follows. First, an image is divided into small blocks, a motion vector is calculated for each block obtained by division, and an overall motion vector is obtained based on the multiple calculated motion vectors.

Also, in a camera system using an interchangeable lens, it is conceivable to use a combination obtained by including a function of performing optical image stabilization in the interchangeable lens and a function of performing optical image stabilization or electrical image stabilization in the camera. Thus, in a system in which each of the camera and lens has a function of performing image stabilization independently, there is also a technique in which the lens and camera do not independently control image stabilization, but cooperate with each other via communication to control image stabilization, whereby the effect of image stabilization is increased.

Japanese Patent Laid-Open No. 2003-186074 discloses that, in a camera system in which a camera has an angular velocity sensor and an interchangeable lens has an image stabilization means, the camera transmits image stabilization data in intervals of a constant period to the interchangeable lens and the interchangeable lens performs image stabilization. However, it is disclosed that data transmission cannot always be performed at a constant interval, and therefore if data transmission is delayed, image stabilization is carried out using the image stabilization data of the previous instance of image stabilization.

As described above, in a system in which a lens and a camera cooperate via communication to control image stabilization, there is a problem in that if a transmission error occurs or communication is delayed, the receiving side cannot set the image stabilization correction amount at the appropriate processing timing for image stabilization.

Also, with the technique disclosed in Japanese Patent Laid-Open No. 2003-186074, image stabilization is only carried out using the image stabilization correction amount of the previous instance of image stabilization, and therefore there is a problem in that the accuracy of image stabilization significantly decreases.

SUMMARY OF THE INVENTION

The present invention has been made in consideration of the above situation, and in the case where image stabilization functions mounted in multiple apparatuses cooperate via communication to perform image stabilization control, a decrease in an effect of image stabilization is suppressed even if a communication error occurs or a delay occurs in communication.

According to the present invention, provided is an image processing apparatus comprising: an acquisition unit configured to acquire an image stabilization correction amount based on image stabilization information acquired from an external device via a communication unit; a prediction unit configured to predict an image stabilization correction amount based on an image stabilization correction amount used in the past; a selector configured to select one of the image stabilization correction amount acquired by the acquisition unit and the image stabilization correction amount predicted by the prediction unit; and an image stabilization unit configured to perform image stabilization based on the image stabilization correction amount selected by the selector, wherein if the image stabilization information is successfully acquired, the selector selects the image stabilization correction amount acquired by the acquisition unit, and if the image stabilization information is not successfully acquired, the selector selects the image stabilization correction amount predicted by the prediction unit.

Further, according to the present invention, provided is an image capturing apparatus comprising: an image sensor for capturing an image; and an image processing apparatus comprising: an acquisition unit configured to acquire an image stabilization correction amount based on image stabilization information acquired from an external device via a communication unit; a prediction unit configured to predict an image stabilization correction amount based on an image stabilization correction amount used in the past; a selector configured to select one of the image stabilization correction amount acquired by the acquisition unit and the image stabilization correction amount predicted by the prediction unit; and an image stabilization unit configured to perform image stabilization based on the image stabilization correction amount selected by the selector, wherein if the image stabilization information is successfully acquired, the selector selects the image stabilization correction amount acquired by the acquisition unit, and if the image stabilization information is not successfully acquired, the selector selects the image stabilization correction amount predicted by the prediction unit.

Furthermore, according to the present invention, provided is an image capturing system comprising a detachable lens unit and an image capturing apparatus, wherein the lens unit includes: a detection unit configured to detect a camera shake amount; a division unit configured to obtain an image stabilization correction amount based on the camera shake amount detected by the detection unit and divide it into a first correction amount to be used by the lens unit and a second correction amount to be used by the image capturing apparatus; a transmission unit configured to transmit the second correction amount to the image capturing apparatus as image stabilization information; and an image stabilization unit configured to perform image stabilization based on the first correction amount, and the image capturing apparatus includes: an image sensor for capturing an image; and an image processing apparatus comprising: an acquisition unit configured to acquire an image stabilization correction amount based on image stabilization information acquired from an external device via a communication unit; a prediction unit configured to predict an image stabilization correction amount based on an image stabilization correction amount used in the past; a selector configured to select one of the image stabilization correction amount acquired by the acquisition unit and the image stabilization correction amount predicted by the prediction unit; and an image stabilization unit configured to perform image stabilization based on the image stabilization correction amount selected by the selector, wherein if the image stabilization information is successfully acquired, the selector selects the image stabilization correction amount acquired by the acquisition unit, and if the image stabilization information is not successfully acquired, the selector selects the image stabilization correction amount predicted by the prediction unit.

Further, according to the present invention, provided is an image processing method comprising: acquiring an image stabilization correction amount based on image stabilization information acquired from an external device via communication; predicting an image stabilization correction amount based on an image stabilization correction amount used in the past; selecting one of the acquired image stabilization correction amount and the predicted image stabilization correction amount; and performing image stabilization based on the selected image stabilization correction amount, wherein in the selection, if the image stabilization information is successfully acquired, the image stabilization correction amount obtained based on the image stabilization information is selected, and if the image stabilization information is not successfully acquired, the predicted image stabilization correction amount is selected.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a flowchart showing processing for calculating an electrical image stabilization correction amount according to the embodiment.

DESCRIPTION OF THE EMBODIMENTS

Exemplary embodiments of the present invention will be described in detail in accordance with the accompanying drawings.

Figure 1:
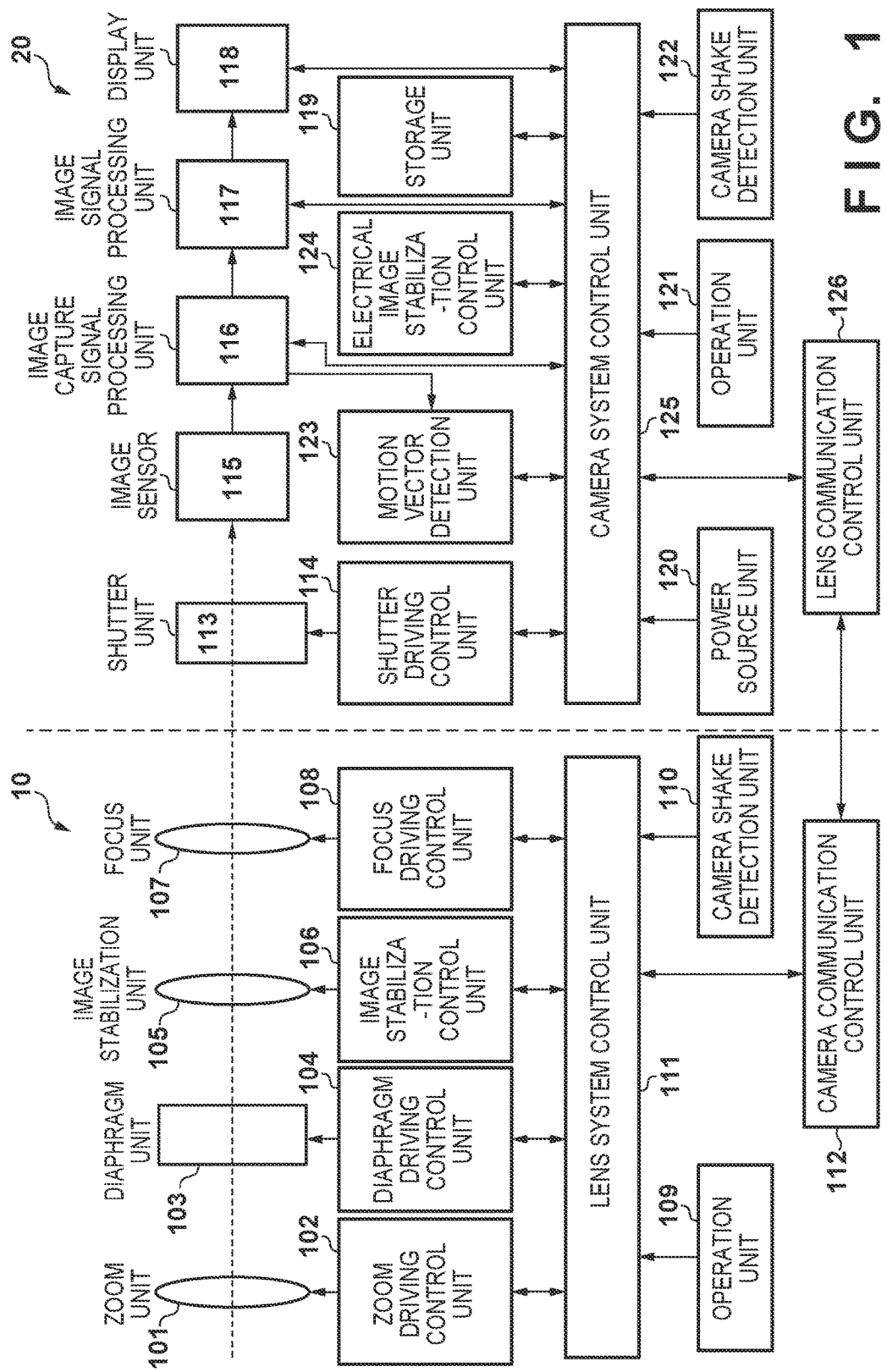
FIG. 1 is a block diagram showing a functional configuration of an image capturing system according to an embodiment of the present invention.

FIG. 1 is a block diagram showing a functional configuration of an image capturing system including an image stabilization apparatus according to an embodiment of the present invention. This image capturing system is an interchangeable-lens digital camera system mainly for capturing still images and moving images, and includes a detachable lens unit 10 and a camera main body 20.

In FIG. 1, an optical system included in the lens unit 10 is constituted by including a zoom unit 101 including a zoom lens for zooming in and out, a diaphragm unit 103, an image stabilization unit 105, and a focus unit 107 including a lens that performs focus adjustment. The zoom unit 101 is driven and controlled by a zoom driving control unit 102, and a diaphragm unit 103 is driven and controlled by a diaphragm driving control unit 104. Also, the image stabilization unit 105 is driven and controlled by an image stabilization control unit 106, and the focus unit 107 is driven and controlled by a focus driving control unit 108.

An operation unit 109 is used to operate the lens unit 10. A camera shake detection unit 110 is a sensor that mainly uses a gyrosensor to detect a camera shake amount applied to the lens as an angular velocity, converts the angular velocity into a voltage (angular velocity data), and outputs the result. A lens system control unit 111 performs overall control of the lens unit 10. A camera communication control unit 112 controls communication with the camera main body 20.

On the other hand, in the camera main body 20, a shutter unit 113 is driven by a shutter driving control unit 114. An image sensor 115 photoelectrically converts an optical image that passes through the above-described optical system and the shutter unit 113 and is incident on the image sensor 115 into an electrical signal. The electrical output from the image sensor 115 is converted into an image signal by an image capture signal processing unit 116, and is furthermore processed by an image signal processing unit 117 according to the application. A display unit 118 performs image display according to need based on the signal output from the image signal processing unit 117.

A storage unit 119 stores various types of data, such as image information. A power source unit 120 supplies power to the overall image capturing system according to the application. An operation unit 121 is used to operate the image capturing system.

Note that image stabilization on/off switches according to which it is possible to switch image stabilization on or off are included in the operation units 109 and 121. When image stabilization is switched on using the image stabilization on/off switch of at least one of the operation units 109 and 121, the lens system control unit 111 and a camera system control unit 125 give instructions to perform an image stabilization operation to the image stabilization control unit 106 and an electrical image stabilization control unit 124 respectively. Then, upon receiving the instructions, the image stabilization control unit 106 and the electrical image stabilization control unit 124 perform image stabilization operations until an instruction to switch off image stabilization is given.

Also, a shutter release button configured to switch on a first switch (SW1) and a second switch (SW2) in sequence according to a pressing amount is included in the operation unit 121. When the shutter release button is pressed in about halfway, the first switch SW1 is switched on, and when the shutter release button is fully pressed in, the second switch SW2 is switched on. When the first switch SW1 is switched on, the focus driving control unit 108 drives the focus unit 107 to perform focus adjustment, and the diaphragm driving control unit 104 drives the diaphragm unit 103 to set it to an appropriate exposure amount. When the second switch SW2 is switched on, image data obtained from an optical image exposed on the image sensor 115 is stored in the storage unit 119.

Furthermore, a video recording switch is included in the operation unit 121. Video capture is started by pressing the switch, and when the switch is pressed once again during recording, recording is ended. By pressing the first switch SW1 and the second switch SW2 during video capture, it is possible to perform still image capture during video recording. Also, a playback mode selection switch according to which it is possible to select a playback mode is also included in the operation unit 121, and during the playback mode, the image stabilization operation is stopped.

A camera shake detection unit 122 is mainly constituted by a gyrosensor, and outputs angular velocity data of the camera shake amount applied to the camera main body 20. A motion vector detection unit 123 analyzes blurring between frames of the image signal and detects motion vectors. The electrical image stabilization control unit 124 performs control of electrical image stabilization by shifting an image cutting-out position. The camera system control unit 125 performs overall control of the image capturing system. A lens communication control unit 126 controls communication with the lens unit 10 (external device). Note that the present invention is not limited to electrical image stabilization, and for example, it is possible to use a configuration in which camera shake is corrected by shifting the image sensor 115 in a direction orthogonal to the optical axis.

Figure 2:
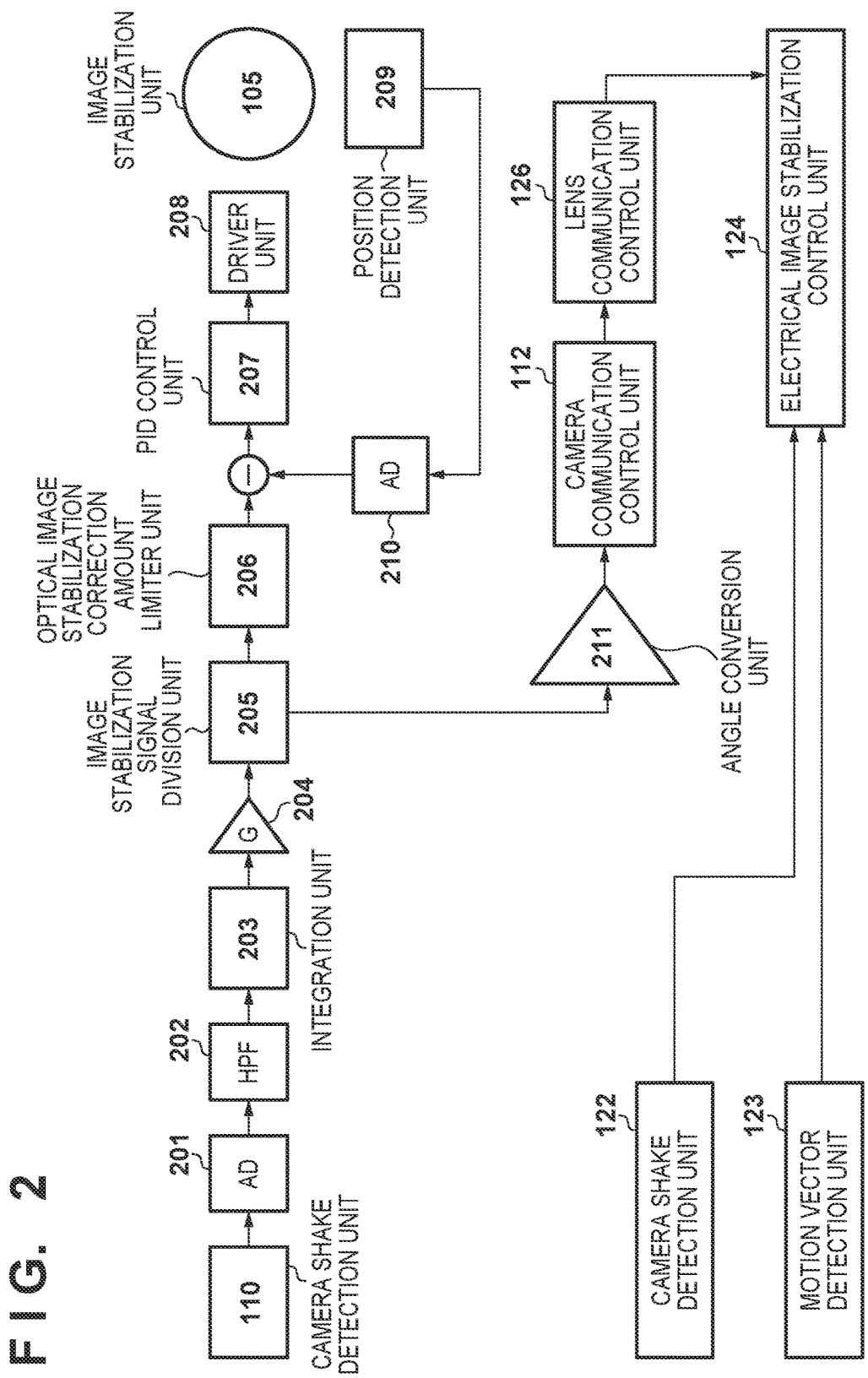
FIG. 2 is a block diagram showing a functional configuration of image stabilization control according to the embodiment.

FIG. 2 is a block diagram showing a configuration relating to image stabilization control in the above-described image capturing system. Note that since the configuration of image stabilization control is the same in the pitch direction and the yaw direction, only the configuration of one direction will be described.

In FIG. 2, the camera shake detection unit 110 provided in the lens unit 10 as described above outputs angular velocity data for the camera shake amount applied to the lens unit 10. An AD conversion unit 201 converts the angular velocity data output by the camera shake detection unit 110 into digital data.

A high-pass filter (HPF) 202 removes offset components and temperature drift components of the camera shake detection unit 110 from the angular velocity data converted by the AD conversion unit 201. An integration unit 203 mainly performs a pseudo integral using a low-pass filter, integrates the angular velocity data, and converts it into angular data. An optical image stabilization sensitivity multiplication unit 204 converts the angular data obtained by the integration unit 203 into a shift amount (image stabilization correction amount) of the correction lens included in the image stabilization unit 105. The sensitivity has a different value at each focal length, and the sensitivity is changed each time the focal length changes. Also, sensitivity variation is absorbed by reflecting a correction amount obtained by sensitivity adjustment of the camera shake detection unit 110 to the sensitivity.

An image stabilization signal division unit 205 divides the image stabilization correction amount in two. Here, among the correction amounts obtained by division, an image stabilization correction amount that is to be applied to optical image stabilization is referred to as a first image stabilization correction amount, and an image stabilization correction amount that is to be applied to electrical image stabilization is referred to as a second image stabilization correction amount. As an example, the division in this context is performed using the ratio between an image stabilization maximum angle of the image stabilization unit 105 in the lens unit 10 and an electrical image stabilization maximum angle of the electrical image stabilization control unit 124 in the camera main body 20. For example, if the image stabilization maximum angle of the image stabilization unit 105 is 0.5 degrees and the electrical image stabilization maximum angle of the electrical image stabilization control unit 124 is 2 degrees, the division is performed at a ratio of 1:4. Note that as described above, instead of electrical image stabilization, correction may be performed by shifting the image sensor 115, and in such a case, it is sufficient to perform division using the ratio between the image stabilization maximum angle of the image stabilization unit 105 and the maximum shift amount of the image sensor 115.

An optical image stabilization correction amount limiter unit 206 clamps the first image stabilization correction amount in the range of motion of the correction lens of the optical image stabilization unit 105. A PID control unit 207 is a controller for controlling the position of the correction lens. A driver unit 208 converts the first image stabilization correction amount into a voltage and supplies a current for driving the correction lens. A position detection unit 209 detects the position of the correction lens and outputs it as a voltage. Reference numeral 210 denotes an image stabilization position AD conversion unit that converts an analog voltage indicating the position of the correction lens into digital data. The converted digital data is subtracted from the first image stabilization correction amount clamped by the optical image stabilization correction amount limiter unit 206. Note that the position detection unit 209 and the AD conversion unit 210 are not necessarily essential components, and it is also possible to use open control.

On the other hand, the second image stabilization correction amount (image stabilization information) is converted into angular data by an angle conversion unit 211. The conversion coefficient has a different value at each focal length and is changed each time the focal length changes. The converted data is transferred to the electrical image stabilization control unit 124 via the camera communication control unit 112 and the lens communication control unit 126. The electrical image stabilization control unit 124 generates an electrical image stabilization correction amount and performs control based on the second image stabilization correction amount, the camera shake amount obtained by the camera shake detection unit 122, and the camera shake amount obtained by the motion vector detection unit 123.

Figure 3:
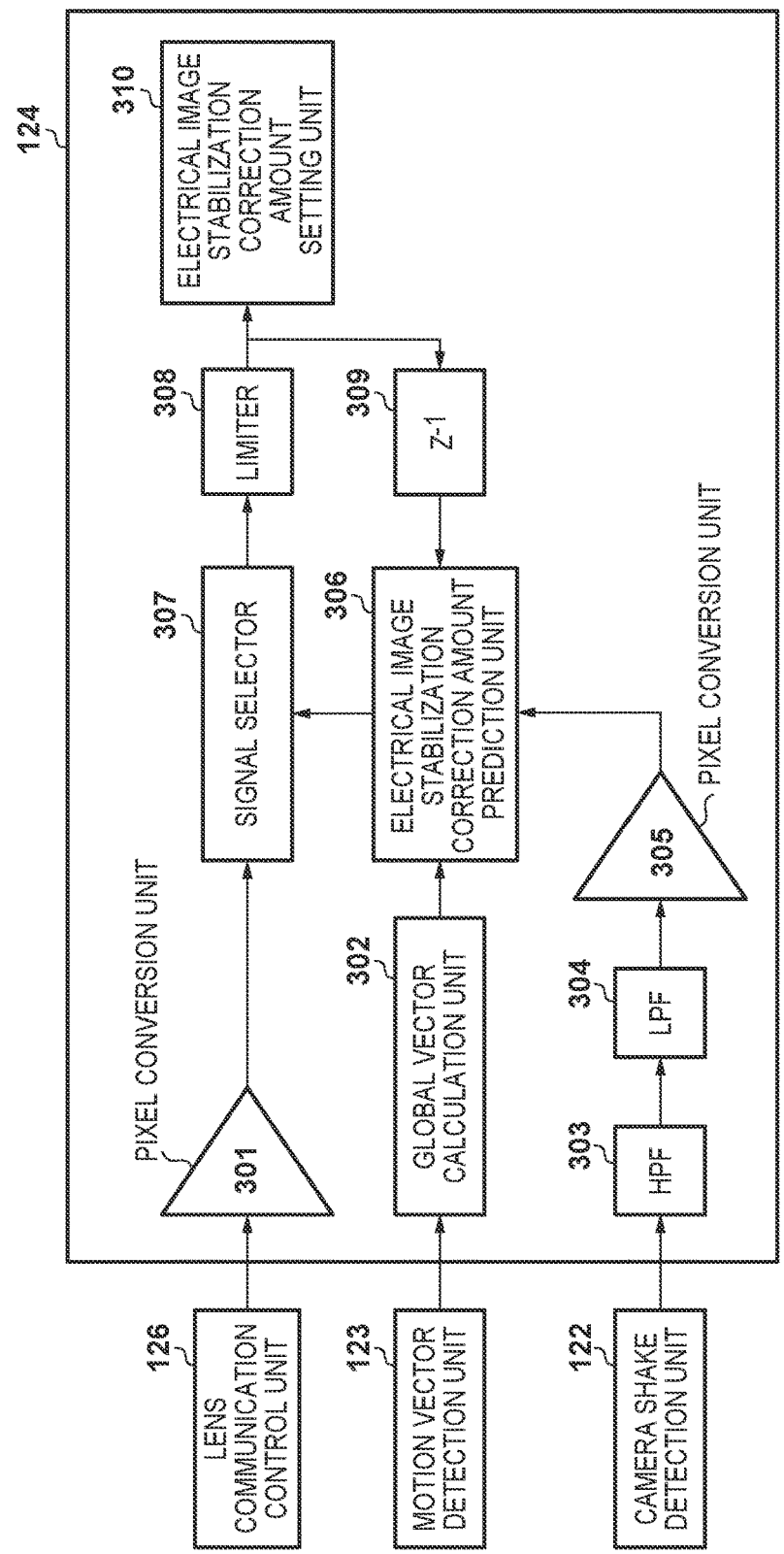
FIG. 3 is a block diagram showing a configuration of an electrical image stabilization control unit according to the embodiment.

FIG. 3 is a block diagram showing details of the electrical image stabilization control unit 124 according to the present embodiment. The lens communication control unit 126 transmits a second image stabilization correction amount received from the lens unit 10 through communication. A pixel conversion unit 301 converts the second image stabilization correction amount that was converted into angular data and transferred into a pixel shift amount. The conversion coefficient in this conversion has a different value at each focal length and is changed each time the focal length changes. The converted pixel shift amount is input into a signal selector 307.

As described above, the motion vector detection unit 123 calculates motion vectors (hereinafter referred to as "local motion vectors") in multiple blocks in the screen by obtaining inter-frame luminance differences of the image signals. Based on multiple calculated local motion vectors, a global vector calculation unit 302 removes noise and object blurring and generates a global vector, which is a camera shake component. The generated global vector is input into an electrical image stabilization correction amount prediction unit 306. Here, reliability is obtained when generating local motion vectors. For example, reliability decreases if significant blurring occurs, if the image is a repeated pattern, if the image is low-contrast, or the like.

Also, as described above, the camera shake detection unit 122 in the camera main body 20 outputs angular velocity data of a camera shake amount applied to the camera main body 20, and the offset and drift component of the camera shake detection unit 122 are removed by a high-pass filter (HPF) 303. A low-pass filter (LPF) 304 cuts high-frequency noise. Similarly to the pixel conversion unit 301, the pixel conversion unit 305 converts the angular velocity data into a pixel shift amount and outputs it to the electrical image stabilization correction amount prediction unit 306. The electrical image stabilization correction amount prediction unit 306 predicts an electrical image stabilization correction amount based on a past second image stabilization correction amount, the global vector, and the camera shake amount detected by the camera shake detection unit 122 in the camera main body 20, and outputs an electrical image stabilization prediction value.

The signal selector 307 selects one of the second image stabilization correction amount that was converted into the pixel shift amount and the electrical image stabilization prediction value, and the limiter 308 clamps the pixel shift amount of the selected second image stabilization correction amount or the electrical image stabilization prediction value in the electrical image stabilization cutting-out range. The pixel shift amount clamped by the limiter 308 is delayed by one frame by a delay unit 309 (stored as past data) and is set as the image cutting-out range for electrical image stabilization by an electrical image stabilization correction amount setting unit 310.

Next, the content of the prediction calculation performed by the electrical image stabilization correction amount prediction unit 306 will be described in detail.

If the past second image stabilization correction amount or electrical image stabilization correction amount is Ez, the most recent global vector is V, and the most recent image stabilization correction amount acquired by the camera shake detection unit 122 is G, the prediction values Epv and Epg for the current second image stabilization correction amount or electrical image stabilization correction amount can be expressed as follows.

$$Epv = Ez + Av \times V \quad (1)$$

$$Epg = Ez + Ag \times G \quad (2)$$

This is a simple linear prediction model, where Equation (1) is a prediction achieved using the global vector, and Equation (2) is a prediction achieved using the camera shake amount detected by the camera shake detection unit 122 of the camera main body 20. Av and Ag are prediction gains.

By applying this model to a Kalman filter or an iterative least-squares technique, it is possible to identify the prediction gains Av and Ag and calculate the prediction values, but the state in which this is possible is when the camera is not panning. In such state, an attempt is made to reliably correct blurring, and centering or the like is not performed against the camera shake, and therefore the error in the above-described model is small. By contrast, if panning or the like is performed, operations other than the image stabilization control, such as centering, are performed concurrently, and therefore the error in the above-described model increases.

However, by monitoring prediction error variances Pv and Pg, which are intermediate variables in a Kalman filter or an iterative least-squares technique, it is possible to check the accuracy of identifying the prediction gains Av and Ag. For this reason, when panning is not being performed, or in other words, when the prediction error variance is small, the prediction values Epv and Epg are calculated by using the identification values of the prediction gains Av and Ag as-is. On the other hand, when panning is being performed, or in other words, when the prediction error variance is larger, by making the prediction gains Av and Ag small, the past second image stabilization correction amount or electrical image stabilization correction amount Ez is gradually brought closer to 0 and centering is performed.

In the present embodiment, two prediction values were described, but one of the prediction values Epv and Epg is selected according to the reliability and the state of the obtained local motion vectors. If it is thought that the reliability of the local motion vectors is low, a prediction value Epg that is based on the camera shake amount and is obtained using Equation (2) is selected, and if not, the prediction value Epv that is based on the global vector and is obtained using Equation (1) is selected. Also, if the camera main body 20 has no function of detecting camera shake, or if the camera main body 20 has no function of detecting a motion vector, the prediction value of the motion vector or the camera shake amount is calculated. If neither function is present, a linear prediction model can be applied by using the value of the frame before last of the second image stabilization correction amount received from the lens unit 10, but there is a problem in that a prediction value predicted based on only past data has a low accuracy at high frequencies.

Next, a Kalman filter, which is a filtering step for prediction, will be described. In the case of a simple linear prediction model (Equation (3)) such as that below, the prediction steps performed using the Kalman filter are the three steps of Equation (4), Equation (5), and Equation (6).

$$y = ax \quad (3)$$

$$K(k) = \frac{P(k-1) \times x(k)}{\sigma_\omega^2 + x(k) \times P(k-1) \times x(k)} \quad (4)$$

$$a(k) = a(k-1) + K(k) \times \{y(k) - x(k) \times a(k-1)\} \quad (5)$$

$$P(k) = P(k-1) - \frac{P(k-1) \times x(k) \times x(k) \times P(k-1)}{\sigma_\omega^2 + x(k) \times P(k-1) \times x(k)} + R_V \quad (6)$$

In Equations (3) to (6) above, k is a filtering step count, y is a prediction value, x is a state coefficient, a is a prediction gain, K is a Kalman gain, P is prediction error variance, $\sigma_\omega^2$ is observation noise variance, and Rv is system noise variance. Also, a random large value is substituted into the initial value P(0) of the prediction error variance P, and a value greater than or equal to 0 and less than or equal to 1 is substituted into the initial value a(0) of the prediction gain a.

Note that y, x, a, and P in Equations (3) to (6) above need only be replaced as follows in the case of performing prediction using a motion vector V and in the case of performing prediction using a camera shake amount G.

|   | Motion vector | Angular velocity |
|---|---|---|
| y | Epv − Ez | Epg − Ez |
| x | V | G |
| a | Av | Ag |
| P | Pv | Pg |

Note that if the observation noise variance $\sigma_\omega^2=1$ and the system noise variance Rv=0, a filtering step of an iterative least-squares technique is achieved, but adaptability is lost, which is not preferable.

The processing above will be described with reference to the flowchart shown in FIG. 4. This series of processes is performed at each frame rate.

In step S401, the most recent global vector calculated by the global vector calculation unit 302, the camera shake amount detected by the camera shake detection unit 122 in the camera main body 20, and the previous second image stabilization correction amount or electrical image stabilization correction amount Ez are obtained. In step S402, the Kalman gain Kv is updated, in step S403, the prediction gain Av is updated and the prediction value Epv is calculated, and in step S404, the prediction error variance Pv is updated. The above-described processing is a Kalman filter step in a prediction model based on Equation (1). Next, in step S405, the Kalman gain Kg is updated, in step S406, the prediction gain Ag is updated and the prediction value Epg is calculated, and in step S407, the prediction error variance Pg is updated. The above-described processing is a Kalman filter step in a prediction model based on Equation (2). Note that the order of the processing of steps S403 and S404 and the processing of steps S405 to S407 may be reversed, or the processing of the steps may be performed simultaneously.

In step S408, at the time when electrical image stabilization processing is performed, it is determined whether or not the most recent electrical image stabilization correction amount (second image stabilization correction amount) transferred from the lens unit 10 via communication was received on time. This determination is performed because sometimes a communication error occurs or the data amount temporarily increases due to the communication of information (e.g., information or the like relating to control of AF, the diaphragm, or the like) other than information relating to image stabilization between the lens unit 10 and the camera main body 20, whereby a delay occurs. If the most recent electrical image stabilization correction amount was received on time, the most recent electrical image stabilization correction amount is selected in step S409.

If it was not received on time, it is determined in step S410 whether or not the reliability of the most recent local motion vector is less than or equal to a predetermined threshold value THr. If the reliability is higher than the threshold value THr, it is determined in step S411 whether or not the prediction error variance Pv obtained using the global vector is smaller than the predetermined threshold value α. In the case of being smaller than the threshold value α, the prediction reliability is high, and therefore the prediction value Epv obtained using the global vector is selected by the signal selector 307 in step S412. Since the prediction reliability is low in the case of being greater than or equal to the threshold value α, in step S415, centering for shifting the cutting-out position of the image to the center (reference state) is performed by making the prediction gain Av smaller and gradually bringing the past second image stabilization correction amount or electrical image stabilization correction amount Ez to 0.

On the other hand, if it is determined in step S410 that the reliability of the local motion vector is less than or equal to the threshold value THr, it is determined in step S413 whether or not the prediction error variance Pg obtained using the camera shake amount detected by the camera shake detection unit 122 in the camera main body 20 is smaller than the predetermined threshold value β. If it is smaller than the threshold value β, the prediction reliability is high, and therefore the prediction value Epg obtained using the camera shake amount G detected by the camera shake detection unit 122 in the camera main body 20 is selected in step S414. Since the prediction reliability is low in the case of being greater than or equal to the threshold value β, in step S415, centering is performed by making the prediction gain Ag smaller and gradually bringing the past second image stabilization correction amount or electrical image stabilization correction amount Ez to 0. Finally, in step S416, the selected electrical image stabilization correction amount is set, the image is cut out, and the image signal is processed.

As described above, with the present embodiment, in the case where an image stabilization function of a lens unit and an image stabilization function of a camera main body cooperate via communication to perform image stabilization control, it is possible to suppress a decrease in an effect of image stabilization even if a communication error occurs or a delay occurs in communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-112955, filed on Jun. 6, 2016, which is hereby incorporated by reference herein in its entirety.

What is claimed is:

1. An image processing apparatus comprising at least one processor and a memory holding a program which makes the processor function as:
   an acquisition unit configured to acquire an image stabilization correction amount based on image stabilization information received from an external device via a communication unit;
   a determine unit configured to determine whether or not the image stabilization information was successfully received from the external device; and
   an image stabilization unit configured to perform image stabilization of an image based on the image stabilization correction amount which is acquired based on the image stabilization information corresponding to the image,
   wherein the image stabilization unit performs image stabilization of a first image based on a first image stabilization correction amount which is acquired based on first image stabilization information corresponding to the first image in a case where the determine unit determines that the first stabilization information was successfully received from the external device, and wherein the image stabilization unit performs image stabilization of the first image based on a second image stabilization correction amount which is acquired based on second image stabilization information corresponding to a second image captured earlier than the first image in a case where the determine unit determines that the first image stabilization information was not successfully received from the external device.

2. The image processing apparatus according to claim 1, wherein the image stabilization unit perform image stabilization by changing a cutting-out position of an image obtained by performing image capture.

3. The image processing apparatus according to claim 1, wherein the image processing apparatus further comprises an image sensor and the image stabilization unit performs image stabilization by shifting the image sensor in a direction orthogonal to an optical axis.

4. The image processing apparatus according to claim 1, wherein
the determine unit determines that the first image stabilization information was not successfully received in a case where communication of the first image stabilization information from the external device is delayed.

5. The image processing apparatus according to claim 1, wherein the acquisition unit acquires the second image stabilization correction amount based on the second image stabilization information by prediction based on the second image stabilization information.

6. The image processing apparatus according to claim 5, the processor further functions as
a detection unit configured to detect a camera shake amount,
wherein the acquisition unit uses the camera shake amount detected by the detection unit to predict the second image stabilization correction amount.

7. The image processing apparatus according to claim 6, wherein the detection unit includes a first detection unit configured to detect a camera shake amount by obtaining a motion vector between frames of an image obtained by performing image capture.

8. The image processing apparatus according to claim 7, wherein the image processing apparatus further comprises an angular velocity sensor and the detection unit further includes a second detection unit configured to detect a camera shake amount using the angular velocity sensor, and
in a case where a reliability of the motion vector is higher than a pre-determined reliability, the acquisition unit predicts an image stabilization correction amount using the camera shake amount detected by the first detection unit, and in a case where the reliability of the motion vector is less than or equal to the pre-determined reliability, the acquisition unit predicts an image stabilization correction amount using the camera shake amount detected by the second detection unit.

9. The image processing apparatus according to claim 8, wherein in a case where a prediction error variance for measuring probability of the image stabilization correction amount predicted by the acquisition unit is greater than or equal to a predetermined threshold value, the image stabilization unit is gradually shifted to a predetermined reference state.

10. The image processing apparatus according to claim 6, wherein the image processing apparatus further comprises an angular velocity sensor and the detection unit includes a second detection unit configured to detect a camera shake amount using the angular velocity sensor.

11. The image processing apparatus according to claim 5, wherein the acquisition unit performs prediction using a Kalman filter or an iterative least-squares technique.

12. An image capturing apparatus comprising:
an image sensor for capturing an image; at least one processor; and
a memory holding a program which makes the processor function as:
an image processing apparatus comprising:
an acquisition unit configured to acquire an image stabilization correction amount based on image stabilization information received from an external device via a communication unit;
a determine unit configured to determine whether or not the image stabilization information was successfully received from the external device;
an image stabilization unit configured to perform image stabilization of an image based on the image stabilization correction amount which is acquired based on the image stabilization information corresponding to the image,
wherein the image stabilization unit performs image stabilization of a first image based on a first image stabilization correction amount which is acquired based on first image stabilization information corresponding to the first image in a case where the determine unit determines that the first image stabilization information was successfully received from the external device; and
wherein the image stabilization unit performs image stabilization of the first image based on a second image stabilization correction amount which is acquired based on second image stabilization information corresponding to a second image captured earlier than the first image in a case where the determine unit determines that the first image stabilization information was not successfully received from the external device.

13. An image capturing system comprising
a detachable lens unit and an image capturing apparatus, wherein
the lens unit includes:
a sensor configured to detect a camera shake amount;
at least one processor; and
a memory holding a program which makes the processor function as:
a division unit configured to obtain an image stabilization correction amount based on the camera shake amount detected by the sensor and divide it into a first correction amount to be used by the lens unit and a second correction amount to be used by the image capturing apparatus;
a communication unit configured to send the second correction amount to the image capturing apparatus as image stabilization information; and
a first image stabilization unit configured to perform image stabilization based on the first correction amount, and
the image capturing apparatus includes:
an image sensor for capturing an image;
at least one processor, and
a memory holding a program which makes the processor function as:
an acquisition unit configured to calculate an image stabilization correction amount based on image stabilization information received from an external device via a communication unit;

a determine unit configured to determine whether or not the image stabilization information was successfully received from the external device; and a second image stabilization unit configured to perform image stabilization of an image based on the image stabilization correction amount which is acquired based on the image stabilization information corresponding to the image, wherein the second image stabilization unit performs image stabilization of a first image based on a first image stabilization correction amount which is acquired based on first image stabilization information corresponding to the first image in a case where the determine unit determines that the first image stabilization information was successfully received from the external device; and wherein the second image stabilization unit performs image stabilization of the first image based on a second image stabilization correction amount which is acquired based on second image stabilization information corresponding to a second image captured earlier than the first image in a case where the determine unit determines that the first image stabilization information was not successfully received from the external device.

14. An image processing method comprising:

determining whether or not the image stabilization information was successfully received from an external device;

performing image stabilization of a first image based on a first image stabilization correction amount which is acquired based on first image stabilization information corresponding to the first image in a case where determined that the first image stabilization information was successfully received from the external device; and performing image stabilization of the first image based on a second image stabilization correction amount which is acquired based on second image stabilization information corresponding to a second image captured earlier than the first image in a case where determined that the first image stabilization information was not successfully received from the external device.

15. The image processing method according to claim 14, wherein in the determination, in a case where communication of the first image stabilization information from the external device is delayed, it is determined that the first image stabilization information was not successfully received.

16. The image processing method according to claim 14, further comprising:

detecting a camera shake amount, wherein the detected camera shake amount is used to acquire an image stabilization correction amount.

17. The image processing method according to claim 16, wherein the camera shake amount is detected as a first camera shake amount by obtaining a motion vector between frames of an image obtained by performing image capture.

18. The image processing method according to claim 17, wherein the camera shake amount is further detected as a second camera shake amount by using an angular velocity sensor, and in a case where a reliability of the motion vector is higher than a pre-determined reliability, an image stabilization correction amount is acquired using the first camera shake amount, and in a case where the reliability of the motion vector is less than or equal to the pre-determined reliability, an image stabilization correction amount is acquired using the second camera shake amount.

* * * * *